(12) United States Patent
Corvasce et al.

(10) Patent No.: US 6,345,656 B1
(45) Date of Patent: Feb. 12, 2002

(54) TIRE WITH LAYER FOR RETARDATION OF AIR PERMEATION

(75) Inventors: Filomeno Gennaro Corvasce, Mertzig (LU); Marie-Rita Catherine Amelie Thise-Fourgon, Bastogne (BE); Alain Emile Francois Roesgen, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/400,797

(22) Filed: Sep. 22, 1999

(51) Int. Cl.$^7$ .................................................. B60C 5/14
(52) U.S. Cl. ................................ 152/510; 152/DIG. 10
(58) Field of Search .................................. 152/510, 511, 152/512, DIG. 10

(56) References Cited

U.S. PATENT DOCUMENTS 5,672,639 A * 9/1997 Corvasce et al. ........... 152/450

* cited by examiner

Primary Examiner—Geoffrey L. Knable
(74) Attorney, Agent, or Firm—Henry C. Young, Jr.

(57) ABSTRACT

The present invention relates to a pneumatic tire having a layer comprised of a starch/plasticizer composite for prevention, or retardation, of air permeation from its inner chamber into the remainder of the tire.

19 Claims, No Drawings

TIRE WITH LAYER FOR RETARDATION OF AIR PERMEATION

FIELD

The present invention relates to a pneumatic tire having a layer of a starch/plasticizer composite for prevention, or retardation, of air permeation from its inner chamber into the remainder of the tire.

BACKGROUND

A pneumatic rubber tire is conventionally of a toroidal shape and comprised of a carcass with a cavity, or chamber, for containing air in which its closure is typically completed with a rigid rim. Such cavity might sometimes be referred to as the tire's "inner air chamber". Such pneumatic tire/rim assembly is well known.

The rubber composition which forms the inner surface of a pneumatic tire, as the exposed surface of the aforesaid cavity, sometimes referred to as an "innerliner", is typically composed of an elastomeric composition designed to prevent, or retard, the permeation of air and moisture into the tire carcass from the tire's inner air chamber.

Butyl rubber is typically relatively impermeable to air and moisture and is often used as a major portion of the innerliner composition and can be a form of butyl rubber or halobutyl rubber such as, for example, bromobutyl rubber. For example, see U.S. Pat. No. 3,808,177. Butyl rubber, while containing a minor amount of units derived from a diene such as, for example isoprene, is not considered herein as being a diene-based rubber since it contains less than 15 percent of its content derived form a diene monomer and, therefore, sulfur vulcanizes at a much slower rate than diene-based elastomers which contain at least, for example, 30 percent of their elastomer content derived from diene monomers. Such innerliner concept is well known to those skilled in such art.

However, the carcass rubber is usually composed of one or more elastomers which are composed of a substantial portion comprised of diene-based elastomers.

Diene-based elastomers would also be desirable for the tire innerliner composition to enhance sulfur vulcanization compatibility between the innerliner rubber and carcass rubber which itself is normally composed of a diene hydrocarbon-based rubber composition.

Also, such butyl innerliners add weight to a pneumatic tire because they must have a sufficient thickness to effect satisfactory reduction in air permeability. While such thickness (e.g.: usually at least about three millimeters) results in a relatively small addition of weight and thickness to the tire, such weight and thickness add, while also small, a nevertheless significant, hysteresis loss to the tire carcass resulting in an increase in rolling resistance of the tire and, accordingly, an increase on fuel consumption for a vehicle on which tires are utilized.

Numerous suggestions have been made for using various materials in place of, or commensurate, with butyl innerliners for pneumatic tires.

For example, polyvinylidene chloride films have been suggested for tire innerliner applications for reduced permeation.

Also, thermoplastic polyester elastomers comprised of a block copolymer of polybutylene terephthalate and polyoxyalkylene diimide diacid resin film and blends of such containing a blend of rubber particles therein has been suggested. See U.S. Pat. No. 5,738,158.

Such starch composite presents a relatively low air permeability, and it is desired to create a successful adaptation of such a composite for use in a tire innerliner.

In the description of this invention, the term "phr" where used herein, and according to conventional practice, refers to "parts of a respective material per 100 parts by weight of rubber, or elastomer".

In the description of this invention, the terms "rubber" and "elastomer" where used herein, may be used interchangeably, unless otherwise prescribed. The terms "rubber composition", "compounded rubber" and "rubber compound", where used herein, are used interchangeably to refer to "rubber which has been blended or mixed with various ingredients and materials" and such terms are well known to those having skill in the rubber mixing or rubber compounding art.

The term "carbon black" as used herein means "carbon blacks having properties typically used in the reinforcement of elastomers, particularly sulfurcurable elastomers".

A reference to a range of values is intended to be inclusive of such values. For example, a range recited as being from one to three would be intended to include the values of one and three.

A reference to an elastomer's Tg refers to its glass transition temperature, which can conveniently be determined by a differential scanning calorimeter at a heating rate of 10° C. temperature increase per minute.

SUMMARY AND PRACTICE OF THE INVENTION

In accordance with one aspect of this invention, a pneumatic tire having an innerliner as:

(A) a thin film of starch/plasticizer composite positioned on and adhered to the surface of a tire carcass diene hydrocarbon-based rubber composition, or (B) a laminate comprised of a first layer positioned on and adhered to a diene-based rubber-based tire carcass surface comprised of (1) a butyl rubber composition or (b) a diene hydrocarbon-based rubber composition; and a second layer positioned on and adhered to an opposing surface of said first layer; wherein the second layer is a thin film of starch/plasticizer composite; wherein said first layer contains an adhesive agent for said starch/plasticizer composite; or (C) a starch/plasticizer composite/elastomer layer comprised of a blend of starch/plasticizer composite of (a) a dispersion of a particulate diene-based rubber composition; wherein the content of said diene-based elastomer particles is from about 10 to about 60 weight percent of said blend, and (b) an adhesive agent for said starch/plasticizer;

wherein said starch/plasticizer composite is comprised of starch and from 10 to about 50 weight percent thereof of a plasticizer for said starch; wherein said starch is composed of amylose units to amylopectin units in a ratio of about 15/85 to about 100/0, alternatively about 15/35 to about 35/64 or about 20/80 to about 80/20, and has a softening point in a range of about 180° C. to about 220° C. according to ASTM No. D1228, and said starch/plasticizer composite has a softening point in a range of about 110° C. to about 170° C. according to ASTM No. D1228; and wherein said adhesive agent has a moiety reactive with hydroxyl groups on the surface of the starch/plasticizer composite and another moiety interactive with said diene-based elastomer(s).

In practice, it is preferred that said thin film of starch/plasticizer has a thickness within a range of about 0.05 to about 2, alternately about 0.05 to about one, millimeters (mm).

In practice, it is preferred that said layer of starch/plasticizer/elastomer blend has a thickness within a range of about 1 to about 4, alternatively about 1 to about 3, mm.

When the film of starch/plasticizer composite is adhered to the opposing surface of a layer of rubber composition, it is generally meant that a surface of such rubber layer which is opposite to the surface thereof, or on the other side of the rubber layer, to which it is designed to be adhered to the tire carcass rubber composition.

In practice, for the laminate (B), the said film of starch/plasticizer composite may be pre-adhered to a said layer of diene-based elastomer composition to form a laminate thereof, followed by (a) adhering said laminate to the surface of said diene-based tire carcass rubber composition or (b) adhering said diene-based tire carcass rubber composition to said laminate, to form an assembly thereof and vulcanizing the resulting assembly to form an integral tire structure.

For the practice of this invention, it is envisioned that the diene-based rubber of the tire carcass to which the aforesaid film of starch/plasticizer composite film is applied may be comprised of at least one diene hydrocarbon-based elastomer in which at least 30 weight percent thereof is derived from a conjugated diene hydrocarbon.

Butyl rubber is not considered herein as being a diene hydrocarbon-based elastomer because units derived from diene hydrocarbons is understood to be conventionally 10 weight percent or less. For example, it is understood that butyl rubber is typically a copolymer of isobutylene and a conjugated diene hydrocarbon such as, for example, isoprene where units derived from the isoprene are in a range of about 2 to about 10, usually from about 4 to about 8, weight percent of the copolymer.

In practice, the adhesive agent, which is intended to aid in adhering said starch/plasticizer composite to a respective diene hydrocarbon-based elastomer, may be a compound which is also sometimes used as a silica coupler for various silica-containing rubber compositions. Representative of such adhesion agents are, for example and not intended to be limiting, are compounds having a general formula (I):

$$(OR)_3—Si—R'—S_n—R'—Si(OR)_3 \qquad (I)$$

wherein "R" is an alkyl radical selected from at least one of methyl and ethyl radicals, preferably an ethyl radical, "PR'" is selected from at least one of methyl, ethyl, propyl and butyl radicals, preferably a propyl radical and "n" is a value from 2 to 8 with an average in a range of from 2 to 2.6 or from 3.5 to 4.

Representative of such compounds are bis(trialkoxyorganosilane) polysulfides such as, for example, bis-(3-trialkoxysilylalkyl) polysulfides which contain an average of from 2 to 2.6 or from 3.5 to 4 connecting sulfur atoms in its polysulfide bridge.

Representative thereof are, for example, his (3triethoxysilylpropyl) polysulfide.

If desired, said film of starch/plasticizer may be from one to three layers of such film wherein the overall thickness thereof is preferably within a range of about 0.15 to about 0.2 millimeters.

A significant aspect of the invention is the use of the thin film of starch/plasticizer composite, or starch/composite/elastomer blend, in combination with or as a replacement for a layer of butyl rubber, or halobutyl rubber, based tire innerliner as an air permeation prevention, or retardation, layer.

Another significant aspect of the invention is the use of a laminate of the thin film of starch/plasticizer composite or starch/plasticizer composite/elastomer blend in conjunction with a diene-based rubber composition which contains an adhesive agent for said starch/plasticizer composite. It is envisioned herein that the adhesive agent reacts with hydroxyl groups contained on the surface of the starch/plasticizer to assist in adhering the starch/plasticizer to the associated diene-based elastomer(s), where reaction may be enhanced during the vulcanization of the tire at an elevated temperature of about 150° C. to about 180° C., thereby creating a novel tire construction which contains starch/diene-based rubber composite with a low air permeability.

It is also envisioned that, because the starch/plasticizer composite is somewhat of a thermoplastic and tends to become somewhat fluid at elevated temperatures above its softening point, while it reacts with the adhesion agent, for example, an alkoxyorganosilane component of a polysulfide compound of formula (I), in the fluid state of the starch composite, to thereby better form an integral innerliner laminate for the tire.

In this manner, then, it is also considered herein that a new, novel, starch/plasticizer-containing integral innerliner laminate is provided which also has a relatively low air permeability property.

This is considered to be a substantial and radical departure from past practice which relied upon an innerliner composed only of butyl rubber, to provide a tire with innerliner composition of relatively low air permeability. Such butyl rubber innerliner inherently has a relative compatibility problem with the diene-based elastomer-based tire carcass plies contained in conventional tires which must be dealt with by varying cure, or vulcanization, packages, or combination of curatives, to create comparable elastomer cure rates between the diene-based elastomer composition of the tire carcass and the butyl rubber composition of a tire innerliner. Such problem is well known to those skilled in such art.

Accordingly, for the practice of this invention, tire innerliner provided without a butyl rubber layer is considered herein to be highly advantageous.

In practice, various diene hydrocarbon-based elastomers may be used for the tire carcass rubber composition and for the innerliner laminates and composites.

For example, such diene hydrocarbon-based elastomers may be selected from polymers and copolymers of isoprene and 1,3-butadiene and from copolymers of at least one of isoprene and 1,3-butadiene and a vinyl aromatic compound selected from styrene and alpha-methylstyrene, preferably styrene.

Representative of such diene-based elastomers may be selected from at least one of, for example, cis 1,4-polyisoprene (natural and synthetic), cis 1,4-polybutadiene, styrene/butadiene copolymers containing from 10 to 40 weight styrene, and isobutene/butadiene copolymers.

In practice, it is considered herein that starch typically has too high of a softening point (e.g.: at least 180° C. and usually at least 200° C. and higher) to be useful for very many elastomer formulations for tires.

Starch/plasticizer composites with a lower softening point have a greater potential for use in such circumstances.

U.S. Pat. Nos. 5,672,639; 5,403,923; 5,258,430; and 4,900,361 disclose the preparation and use of various starch compositions including use thereof for tire components.

Starch is understood herein to be a composition 20 which might be represented as a carbohydrate polymer having repeating units of amylose (anhydroglucopyranose units joined by glucosidic bonds) and amylopectin, a branched chain structure, as is well known to those having skill in such art. Typically, starch is composed of about 25 percent amylose and about 75 percent amylopectin. (*The Condensed Chemical Dictionary, Ninth Edition* (1977)), revised by G. G. Hawley, published by Van Nostrand Reinhold Company, page 813). Starch can be, reportedly, a reserve polysaccharide in plants such as, for example, corn (e.g.: corn starch), potatoes, rice and wheat as typical commercial sources.

It is considered herein that a development of a starch/plasticizer composition, or compositions, with a softening point significantly lower than that of the starch alone, allows the starch to be more easily mixed and processed in conventional elastomer processing equipment.

In practice, it is desired that the synthetic plasticizer itself is compatible with the starch, and has a softening point lower than the softening point of the starch so that it causes the softening of the blend of the plasticizer and the starch to be lower than that of the starch alone. This phenomenon of blends of compatible polymers of differing softening points having a softening point lower than the highest softening point of the individual polymer(s) in the blend is well known to those having skill in such art.

In one aspect, a lowering of a softening point for the starch may be the use of, for example, a polymeric plasticizer such as, for example, poly(ethylenevinyl alcohol) with a softening point of less than 160° C. Other plasticizers, and their mixtures, are contemplated for use in this invention, provided that they have softening points of less than the softening point of the starch, and preferably less than 160° C., which might be, for example, one or more copolymers and hydrolyzed copolymers thereof selected from ethylenevinyl acetate copolymers having a vinyl acetate molar content of from about 5 to about 90, alternatively about 20 to about 70, percent, ethylene-glycidal acrylate copolymers and ethylene-maleic anhydride copolymers. As hereinbefore stated, hydrolyzed forms of copolymers are also contemplated. For example, the corresponding ethylene-vinyl alcohol copolymers, and ethylene-acetate vinyl alcohol terpolymers may be contemplated so long as they have a softening point lower than that of the starch and preferably lower than 160° C.

In general, the blending of the starch and plasticizer involves what are considered or believed herein to be relatively strong chemical and/or physical interactions between the starch and the plasticizer.

In general, and as heretofore herein discussed, the starch/plasticizer composite desirably has a starch to plasticizer weight ratio in a range of about 0.4/1 to about 5/1, alternatively about 1/1 to about 3/1, so long as the starch/plasticizer composition has the required softening point range, and preferably, is capable of being a free flowing, dry powder or extruded pellets, before it is mixed with the elastomer(s).

While the synthetic plasticizer(s) may have a viscous nature at room temperature, or at about 23° C. and, thus, considered to be a liquid for the purposes of this description, although the plasticizer may actually be a viscous liquid at room temperature since it is to be appreciated that many plasticizers are polymeric in nature.

Representative examples of synthetic plasticizers are, for example, poly(ethylenevinyl alcohol), cellulose acetate and diesters of dibasic organic acids, so long as they have a softening point sufficiently below the softening point of the starch with which they are being combined so that the starch/plasticizer composite has the required softening point range.

Preferably, the synthetic plasticizer is selected from at least one of poly(ethylenevinyl alcohol) and cellulose acetate.

For example, the aforesaid poly(ethylenevinyl alcohol) might be prepared by polymerizing vinyl acetate to form a poly(vinylacetate) which is then hydrolyzed (acid or base catalyzed) to form the poly(ethylenevinyl alcohol). Such reaction of vinyl acetate and hydrolyzing of the resulting product is well known those skilled in such art.

For example, vinylalcohol/ethylene (60/40 mole ratio) copolymers can be obtained in powder forms at different molecular weights and crystallinities such as, for example, a molecular weight of about 11700 with an average particle size of about 11.5 microns or a molecular weight (weight average) of about 60,000 with an average particle diameter of less than 50 microns.

Various blends of starch and ethylenevinyl alcohol copolymers can then be prepared according to mixing procedures well known to those having skill in such art.

Other plasticizers might be prepared, for example and so long as they have the appropriate Tg and starch compatibility requirements, by reacting one or more appropriate organic dibasic acids with aliphatic or aromatic diol(s) in a reaction which might sometimes be referred to as an "esterification condensation reaction". Such esterification reactions are well known to those skilled in such art.

In practice, the said starch/synthetic plasticizer composite may typically have a moisture content in a range of about zero to about 30, alternatively about one to about six, weight percent.

The starch is understood to be typically composed of amylose units and/or amylopectin units. These are well known components of starch. Typically, it is understood herein that the starch is composed of a combination of the amylose and amylopectin units in a ratio of about 25/75, also the starch may be composed entirely of amylose units. A somewhat broader range of ratios of amylose to amylopectin units is recited herein in order to provide a starch for the starch composite which interact with the plasticizer somewhat differently. For example, it is considered herein that suitable ratios may be from about 20/80 up to 100/0, although a more suitable range is considered to be about 15/85 to about 35/63.

The starch can typically be obtained from naturally occurring plants, as hereinbefore referenced. The starch/plasticizer composition can be present in various particulate forms such as, for example, fibrils, spheres or macromolecules, which may, in one aspect, depend somewhat upon the ratio of amylose to amylopectin in the starch as well as the plasticizer content in the composite.

The relative importance, if any, of such forms of the starch is the difference in their reinforcing associated with the filler morphology. The morphology of the filler primarily determines the final shape of the starch composite within the elastomer composition, in addition, the severity of the mixing conditions such as high shear and elevated temperature can allow to optimize the final filler morphology. Thus, the starch composite, after mixing, may be in a shape of one or more of hereinbefore described forms.

It is important to appreciate that the starch, by itself, is hydrophilic in nature, meaning that it has a strong tendency to bind or absorb water. Thus, the moisture content for the starch and/or starch composite has been previously discussed herein. This is considered to be an important, or desirable, feature in the practice of this invention because water can also act somewhat as a plasticizer with the starch and which can sometimes associate with the plasticizer itself for the starch composite such as polyvinyl alcohol and cellulose acetate, or other plasticizer which contain similar functionalities such as esters of polyvinyl alcohol and/or cellulose acetate or any plasticizer which can depress the melting point of the starch.

Various grades of the starch/plasticizer composition can be developed to be used with various elastomer compositions and processing conditions.

As hereinbefore pointed out, the starch is understood to typically have a softening point of at least 180° C., usually at least 200° C. For example, it may have a softening point in a range of about 200° C. to about 220° C., depending somewhat upon its ratio of amylose to amylopectin units, as well as other factors and, thus, does not readily soften when the rubber is conventionally mixed, for example, at a temperature in a range of about 140° C. to about 165° C. Accordingly, after the rubber is mixed, the starch remains in a solid particulate form, although it may become somewhat elongated under the higher shear forces generated while the rubber is being mixed with its compounding ingredients. Thus, the starch remains largely incompatible with the rubber and is typically present in the rubber composition in individual domains.

However, it is now considered herein that providing starch in a form of a starch composite of starch and a plasticizer is particularly beneficial in providing such a composition with a softening point in a range of about 110° C. to about 160° C.

The plasticizers can typically be combined with the starch such as, for example, by appropriate physical mixing processes, particularly mixing processes that provide adequate shear force.

The combination of starch and, for example, polyvinyl alcohol or cellulose acetate, is referred to herein as a "composite". Although the exact mechanism may not be completely understood, it is believed that the combination is not a simple mixture but is a result of chemical and/or physical interactions. It is believed that the interactions lead to a configuration where the starch molecules interact via the amylose with the vinyl alcohol, for example, of the plasticizer molecule to form complexes, involving perhaps chain entanglements. The large individual amylose molecules are believed to be interconnected at several points per molecule with the individual amylopectin molecules as a result of hydrogen bonding (which might otherwise also be in the nature of hydrophilic interactions).

This is considered herein to be beneficial because, by varying the content and/or ratios of natural and synthetic components of the starch composite, it is believed to be possible to alter the balance between hydrophobic and hydrophilic interactions between the starch components and the plasticizer to allow, for example, the starch composite filler to vary in form from spherical particles to fibrils.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having an innerliner which comprises:
   (i) a laminate comprised of a first layer positioned on and adhered to a diene-based rubber-based tire carcass surface comprised of (1) a butyl rubber composition or (b) a diene hydrocarbon-based rubber composition; and a second layer positioned on and adhered to an opposing surface of said first layer; wherein the second layer is a thin film of starch/plasticizer composite; wherein said first layer contains an adhesive agent for said starch/plasticizer composite; or
   (ii) a starch/plasticizer composite/elastomer layer comprised of a blend of starch/plasticizer composite and dispersion therein of (a) a particulate diene-based rubber composition; wherein the content of said diene-based elastomer particles is from about 10 to about 60 weight percent of said blend, and (b) an adhesive agent for said starch/plasticizer;

wherein said starch/plasticizer composite is comprised of starch and plasticizer of a weight ratio in a range of about 0.4/1 to about 5/1; wherein said starch is composed of amylose units to amylopectin units in a ratio of about 15/85 to about 100/0, and has a softening point according to ASTM No. D 1228 in a range of about 180° C. to about 220° C.; and said starch/plasticizer composite has a softening point in a range of about 110° C. to about 170° C. according to ASTM No. D1228; and wherein said adhesive agent has a moiety reactive with hydroxyl groups on the surface of the starch/plasticizer composite and another moiety interactive with said diene-based elastomer(s).

2. The tire of claim 1 wherein said thin film of starch/plasticizer has a thickness within a range of about 0.05 to about 2 millimeters.

3. The tire of claim 1 wherein said layer of starch/plasticizer/elastomer blend has a thickness within a range of about 1 to about 4 millimeters.

4. The tire of claim 1 wherein said diene-based rubber of said tire carcass to which the aforesaid film, layer or laminate is adhered is comprised of at least one diene hydrocarbon-based elastomer in which at least 30 weight percent thereof is derived from a conjugated diene hydrocarbon.

5. The tire of claim 1 wherein said adhesive is a compound of the general formula (I):

$$(OR)_3\text{—Si—R'—S}_n\text{—R'—Si—}(OR)_3 \qquad (I)$$

wherein "R" is an alkyl radical selected from at least one of methyl and ethyl radicals, "R'" is selected from at least one of methyl, ethyl, propyl and butyl radicals and "n" is a value from 2 to 8 with an average in a range of from 2 to 2.6 or from 3.5 to 4.

6. The tire of claim 1 wherein said adhesive agent is a bis-(3-trialkoxysilylalkyl) polysulfide which contains an average of from 2 to 2.6 or from 3.5 to 4 connecting sulfur atoms in its polysulfidic bridge.

7. The tire of claim 1 wherein said adhesive agent is a bis-(3-triethoxysilylpropyl) polysulfide having an average of from 2 to 2.5 or from 3.5 to 4 connecting sulfur atoms in its polysulfidic bridge.

8. The tire of claim 1 wherein said starch of said starch/plasticizer composite is comprised of amylose units and amylopectin units in a ratio of about 15/85 to about 35/65 thereof.

9. The tire of claim 1 wherein said plasticizer of said starch/plasticizer composite is a liquid at 23° C. and is selected from at least one of poly(ethylenevinyl alcohol), cellulose acetate and plasticizers based, at least in part, upon diesters of dibasic organic acids that form said starch/plasticizer composite having a softening point in a range of about 110° C. to about 160° C. when combined with said starch in a weight ratio of starch to plasticizer in a range of about 1/1 to about 3/1.

10. The tire of claim 1 wherein said plasticizer of said starch/plasticizer has a softening point of less than the softening point of said starch and less than 160° C. and is selected from at least one of poly(ethylenevinyl alcohol), cellulose acetate and copolymers, and hydrolyzed copolymers, of ethylene-vinyl acetate copolymers having a vinyl acetate molar content of from about 5 to about 90 percent, ethylene-glycidal acrylate copolymers and ethylene-maleic anhydride copolymers.

11. The tire of claim 1 wherein said plasticizer of said starch/plasticizer has a softening point of less than the softening point of said starch and less than 160° C. and is an ethylene-vinyl acelate copolymer having a vinyl acetate molar content within a range of from about 20 to about 60 percent.

12. The tire of claim 1 wherein said film of starch/plasticizer is comprised of from one to and including three layers of such film; wherein the overall thickness of said layers of film is within a range of 0.15 to about 3 mm.

13. The tire of claim 1 wherein said innerliner is said innerliner (i), prepared by adhering said film of starch/plasticizer composite to said diene-based rubber layer to form an laminate thereof followed by (a) adhering said laminate to the surface of said diene-based tire carcass rubber composition or (b) adhering said diene-based tire carcass rubber composition to said laminate, to form an assembly thereon and then vulcanizing the assembly to form an integral tire structure.

14. The tire of claim 1 wherein said innerliner comprises a laminate comprised of a first layer positioned on and adhered to a diene-based rubber-based tire carcass surface comprised of (1) a butyl rubber composition or (b) a diene hydrocarbon-based rubber composition; and a second layer positioned on and adhered to an opposing surface of said first layer; wherein second layer is a thin film of starch/plasticizer composite; wherein said first layer contains an adhesive agent for said starch/plasticizer composite.

15. The tire of claim 14 wherein said thin film has a thickness in a range of about 0.05 to about 2 mm and where said adhesive agent is a compound of the general formula (I):

$$(OR)_3-Si-R'-S_n-R'-Si-(OR)_3 \qquad (I)$$

wherein "R" is an alkyl radical selected from at least one of methyl and ethyl radicals, "R'" is selected from at least one of methyl, ethyl, propyl and butyl radicals and "n" is a value from 2 to 8 with an average in a range of from 2 to 2.6 or from 3.5 to 4.

16. The tire of claim 15 wherein said adhesive agent is a bis-(3-trialkoxysilylalkyl) polysulfide which contains an average of from 2 to 2.6 or from 3.5 to 4 connecting sulfur atoms in its polysulfidic bridge.

17. The tire of claim 1 wherein said innerliner is comprised of a starch/plasticizer composite/elastomer layer comprised of a blend of starch/plasticizer composite and dispersion therein of (a) a particulate diene-based rubber composition; wherein the content of said diene-based elastomer particles is from about 10 to about 60 weight percent of said blend, and (b) an adhesive agent for said starch/plasticizer.

18. The tire of claim 17 wherein said adhesive agent is a compound of the general formula (I):

$$(OR)_3-Si-R'-S_n-R'-Si-(OR)_3 \qquad (I)$$

wherein "R" is an alkyl radical selected from at least one of methyl and ethyl radicals, "R'" is selected from at least one of methyl, ethyl, propyl and butyl radicals and "n" is a value from 2 to 8 with an average in a range of from 2 to 2.6 or from 3.5 to 4.

19. The tire of claim 17 wherein said adhesive agent is a bis-(3-trialkoxysilylalkyl) polysulfide which contains an average of from 2 to 2.6 or from 3.5 to 4 connecting sulfur atoms in its polysulfidic bridge.

* * * * *